United States Patent
Pniewski et al.

(10) Patent No.: US 10,442,266 B2
(45) Date of Patent: Oct. 15, 2019

(54) AIR SPRING STANDING PISTON BEARING

(71) Applicant: Continental Automotive Systems, Inc., Auburn Hills, MI (US)

(72) Inventors: Garrett Mark Pniewski, Bloomfield Hills, MI (US); Joseph G Jerisk, Burton, MI (US)

(73) Assignee: Continental Automotive Systems, Inc., Auburns Hills, MI (US)

( * ) Notice: Subject to any disclaimer, the term of this patent is extended or adjusted under 35 U.S.C. 154(b) by 0 days.

(21) Appl. No.: 15/368,938

(22) Filed: Dec. 5, 2016

(65) Prior Publication Data

US 2018/0154724 A1 Jun. 7, 2018

(51) Int. Cl.
| | | |
|---|---|---|
| *B60G 15/14* | (2006.01) | |
| *B60G 15/12* | (2006.01) | |
| *B60G 11/27* | (2006.01) | |
| *B60G 13/08* | (2006.01) | |
| *F16F 9/084* | (2006.01) | |

(52) U.S. Cl.
CPC .............. *B60G 15/12* (2013.01); *B60G 11/27* (2013.01); *B60G 13/08* (2013.01); *F16F 9/084* (2013.01); *B60G 2202/152* (2013.01); *B60G 2204/1262* (2013.01); *B60G 2204/418* (2013.01); *F16F 2230/0023* (2013.01)

(58) Field of Classification Search
CPC .... F16F 9/057; F16F 9/084; F16F 2230/0023; B60G 13/08; B60G 15/12; B60G 2202/152; B60G 2204/1262; B60G 2204/418; B60G 2204/416

USPC .......... 267/64.19, 64.21, 64.23, 64.24, 64.27
See application file for complete search history.

(56) References Cited

U.S. PATENT DOCUMENTS

| | | | | |
|---|---|---|---|---|
| 4,817,928 A | * | 4/1989 | Paton .................... | B60G 13/006 267/219 |
| 5,135,203 A | * | 8/1992 | Wijnhoven ....... | B60G 17/01933 267/64.21 |
| 6,116,584 A | * | 9/2000 | Romer ................. | B60G 13/003 267/34 |
| 6,286,820 B1 | * | 9/2001 | Raulf ..................... | B60G 15/14 267/64.21 |
| 6,454,248 B2 | * | 9/2002 | Pradel .................. | B60G 17/044 267/64.11 |
| 6,581,918 B2 | * | 6/2003 | Voelkel ................. | B60G 15/14 188/321.11 |

(Continued)

*Primary Examiner* — Thomas W Irvin

(57) ABSTRACT

An air spring assembly for a vehicle having a damper body decoupled from a piston, allowing the damper to rotate freely without inducing torsion into the piston. The air spring assembly includes a damper body, where part of the damper body is disposed in a piston, and a decoupling mechanism connected to the damper body. The decoupling mechanism allows for rotation of the damper body relative to the piston, preventing torsion from being transferred from the damper body to the piston. The decoupling mechanism includes an adapter ring connected to the damper body, and a rotatable machine element surrounding the damper body. The adapter ring is surrounded part of the piston, and the rotatable machine element is adjacent the adapter ring. The inner wall of the piston is in contact with the rotatable machine element, such that the rotatable machine element facilitates relative rotation between the piston and damper body.

16 Claims, 2 Drawing Sheets

(56) References Cited

U.S. PATENT DOCUMENTS

| | | | |
|---|---|---|---|
| 7,011,301 B2* | 3/2006 | Oldenettel | B60G 15/14 188/322.12 |
| 8,517,357 B2* | 8/2013 | Chapman | F16F 9/0454 267/64.21 |
| 8,979,076 B2* | 3/2015 | Oldenettel | F16F 9/38 267/64.24 |
| 9,694,642 B2* | 7/2017 | Kantor | B60G 15/062 |
| 2003/0127781 A1* | 7/2003 | Fritz | B60G 15/12 267/64.24 |
| 2011/0140323 A1* | 6/2011 | Kwon | B60G 15/12 267/64.24 |

* cited by examiner

AIR SPRING STANDING PISTON BEARING

FIELD OF THE INVENTION

The invention relates generally to an air spring assembly which is more tolerant of torsion induced by vehicle kinematics.

BACKGROUND OF THE INVENTION

Suspension systems for automotive vehicles provide vehicle passengers with a more comfortable ride. Aft suspension systems utilize air springs, rather than traditional coil springs. Air suspension systems provide different suspension qualities that may be preferable in some vehicles to traditional coil spring suspensions.

A conventional aft spring is a device that is arranged between a vehicle body and chassis. The typical air spring has at least one working space, or cavity that is filled with compressed air. Air spring pistons typically seal the aft chamber against a hydraulic shock absorber (damper). Vehicle kinematics may induce torsion into the air spring assembly during the operation of the vehicle. Many air spring systems are limited by the amount of torsion they are able to withstand, and are not equipped to handle torsion levels above a certain threshold.

Accordingly, there exists a need for an air spring assembly which is able to tolerate increased levels of torsion induced by vehicle kinematics.

SUMMARY OF THE INVENTION

The present invention is an air spring assembly for a vehicle having a damper body which is decoupled from a piston, allowing the damper to rotate freely without inducing torsion into the piston.

In one embodiment, the present invention is an air spring assembly which includes a damper body and a piston, where part of the damper body is disposed in the piston, and a decoupling mechanism connected to the damper body, a portion of the piston surrounding the decoupling mechanism. The decoupling mechanism allows for rotation of the damper body relative to the piston, preventing torsion from being transferred from the damper body to the piston.

In one embodiment, the decoupling mechanism includes an adapter ring connected to the damper body, and a rotatable machine element surrounding the damper body. The adapter ring is surrounded by a portion of the piston, and the rotatable machine element is adjacent the adapter ring. The inner wall of the piston is in contact with the rotatable machine element, such that the rotatable machine element facilitates relative rotation between the piston and the damper body.

The adapter ring includes a lower flange portion, an upper flange portion, a groove disposed between the upper flange portion and the lower flange portion, and a seal disposed in the groove. The piston surrounds the lower flange portion and the upper flange portion such that the seal is in contact with the inner wall of the piston, preventing air from exiting the piston.

In one embodiment, the rotatable machine element is a bearing, however, it is within the scope of the invention that other types of rotatable machine elements may be used, such as, but not limited to, a ball bearing, a needle bearing, a journal bearing, a bushing, or the like.

An outer flange ring is formed as part of the piston, and an outer flange portion is connected to the damper body. The outer flange portion is in contact with the outer flange ring such that the outer flange ring rotates relative to the outer flange portion as the damper rotates relative to the piston.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
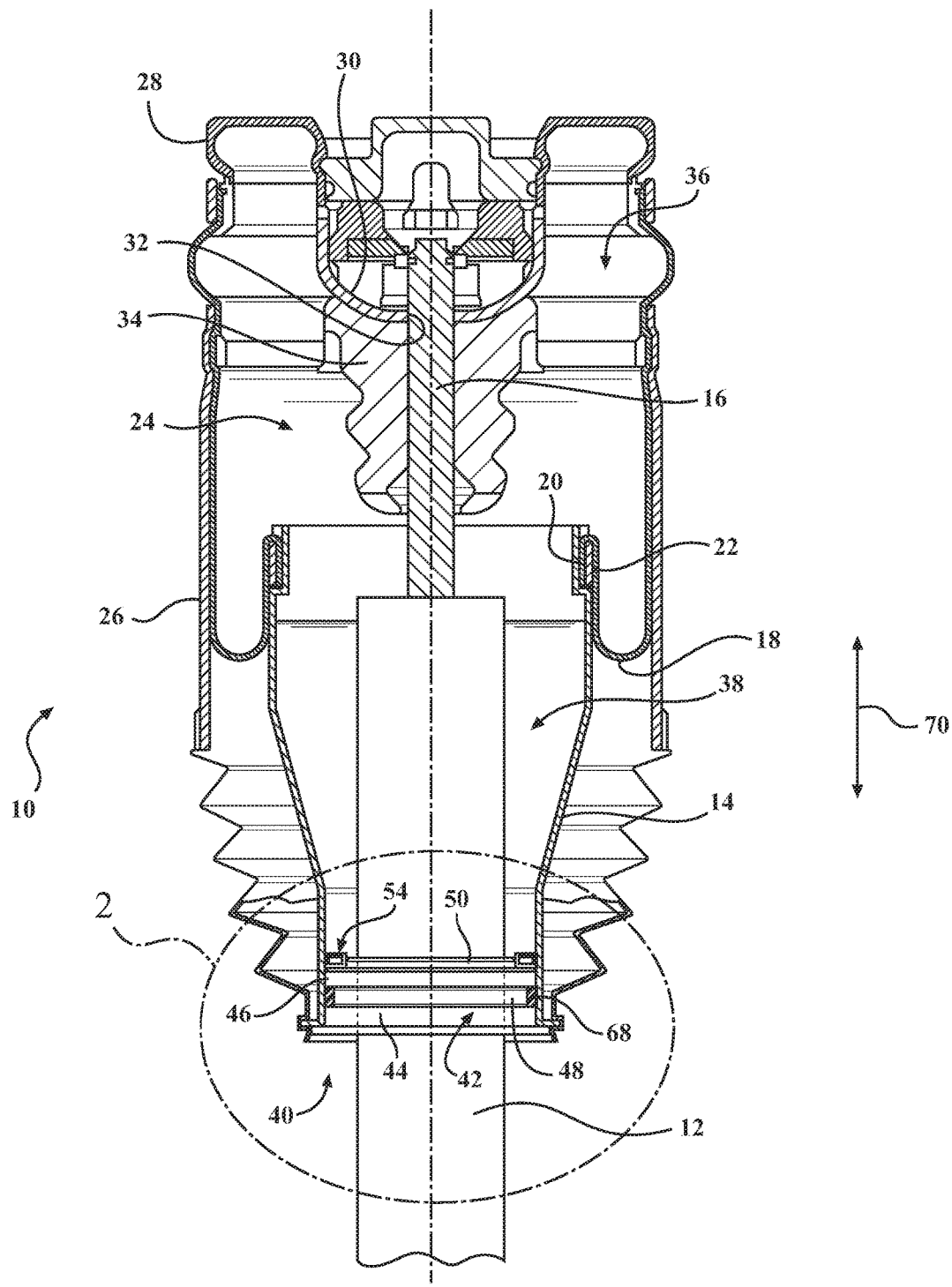
FIG. 1 is a sectional view of an air spring assembly, according to embodiments of the present invention.

An air spring assembly having a decoupling mechanism according to the present invention is shown in FIG. 1, generally at 10. The air spring 10 includes a damper body 12, and surrounding a portion of the damper body 12 is an outer piston 14.

Extending into the damper body 12 is a damper rod 16, such that the damper body 12 is able to move relative to the damper rod 16. The air spring 10 also includes a bellow 18, which is flexible and able to change shape as the piston 14 is moved relative to the damper rod 16. A free end 20 of the bellow 18 is clamped between a clamping ring 22 and a portion of the outer piston 14.

The bellow 18 includes a cavity, shown generally at 24, which is generally filled with air. The bellow 18 is partially surrounded by a guide tube 26, and the guide tube 26 and the bellow 18 are connected to a top cap 28. The top cap 28 includes a base portion 30, and extending through an aperture 32 in the base portion 30 is the damper rod 16. The damper rod 16 also extends through a jounce bumper 34, which is partially surrounded by, and connected, to the top cap 28.

The top cap 28 also has a cavity, shown generally at 36, which is in fluid communication with the cavity 24 of the bellow 18. The piston 14 also includes a cavity, shown generally at 38, which is also in fluid communication with the cavity 24 of the bellow 18. All of the cavities 24,36,38 define a volume which changes as the piston 14 and damper 12 move relative to the damper rod 16.

The top cap 28 is connected to another component of the vehicle, such the frame of the vehicle, but it is within the scope of the invention that the top cap 28 may be connected to other components of the vehicle as well. Additionally, the damper body 12 is connected to another part of the suspension system of the vehicle, such as an A-arm, or swing arm. As the A-arm moves from (operation of the vehicle) the damper body 12 and piston 14 move in either of the directions indicated by arrow 70 relative to the damper rod 16.

As the vehicle is in operation, and travelling, there may be instances where the vehicle kinematics induce torsion into the air spring assembly 10.

Figure 2:
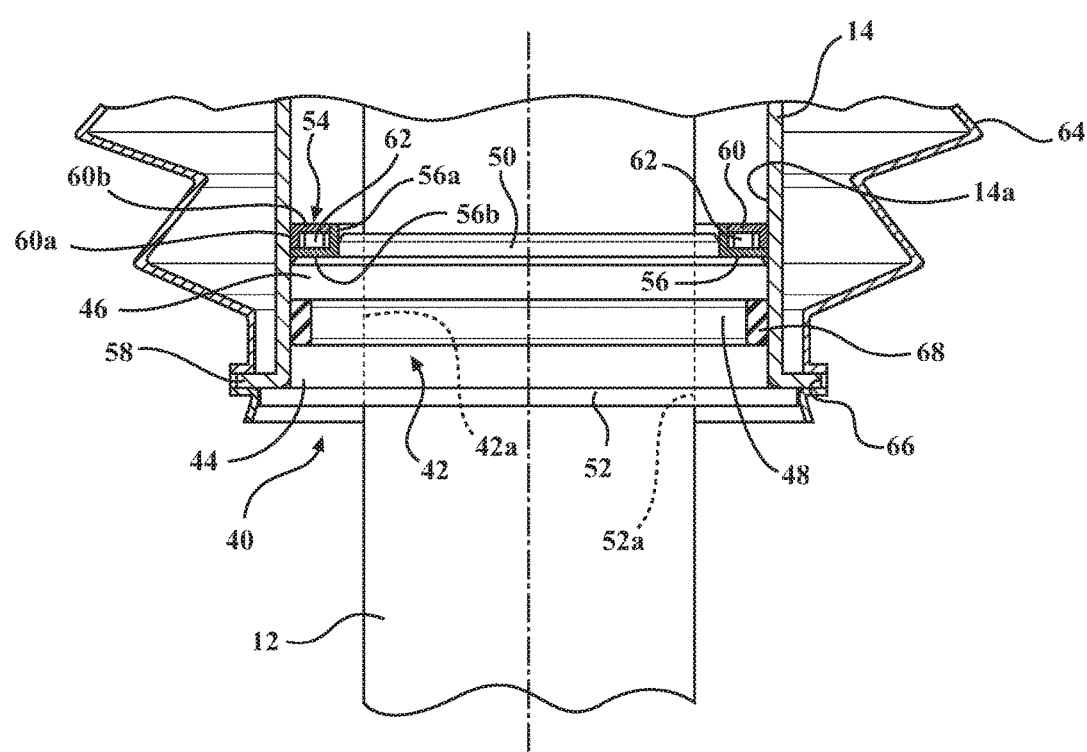
FIG. 2 an enlarged view of the circled portion of FIG. 1, according to embodiments of the present invention.

The air spring assembly 10 includes a decoupling mechanism, shown generally at 40 in FIGS. 1 and 2. The decoupling mechanism 40 reduces or eliminates the transfer of torsion from the damper body 12 to the piston 14. The mechanism 40 includes an adapter ring, shown generally at 42, where the damper body 12 extends through an aperture 42a formed as part of the adapter ring 42. The adapter ring 42 is welded to the damper body 12 such that during operation of the air spring assembly 10, the adapter ring 42 moves with the damper body 12. The adapter ring 42 includes a lower flange portion 44 and an upper flange portion 46, and disposed in between the flange portions 44,46 is a groove 48. Adjacent the upper flange portion 46 is an inner flange portion 50, which has a smaller diameter than the upper flange portion 46. The flange portions 44,46, 50 and the area of the adapter ring 42 having the groove 48 are all formed as a single component.

Also connected to the damper body 12 is an outer flange portion 52. The outer flange portion 52 is connected to the damper body 12 through welding or the like. The outer flange portion 52 includes an aperture 52a, and the damper body 12 also extends through the aperture 52a of the outer flange portion 52. The adapter ring 42 is connected to the damper body 12 such that the lower flange portion 44 is adjacent to and supported by the outer flange portion 52. The mechanism 40 also includes a rotatable machine element, shown generally at 54, which in this embodiment is a bearing 54. The bearing 54 includes an inner race 56 having two wall portions 56a,56b, with the first wall portion 56a in contact with the inner flange portion 50 of the adapter ring 42, and the second wall portion 56b in contact with the upper flange portion 46 of the adapter ring 42.

The piston 14 is placed around the bearing 54 and the adapter ring 42 such that there is a press-fit connection between the bearing 54 and the piston 14, and a press-fit connection between the adapter ring 42 and the piston 14. The piston 14 includes an outer flange ring 58, part of which is in contact with the outer flange portion 52 of the damper body 12.

The piston 14 is press-fit around the bearing 54 such that an end of the second wall portion 56b is in contact with the piston 14. The bearing 54 also includes an outer race 60 having two wall portions 60a,60b, with the first wall portion 60a being in contact with the piston 14. Disposed between the inner race 56 and the outer race 60 is a plurality of bearing members 62, which provide for free rotation between the inner race 56 and the outer race 60.

The air spring assembly 10 also includes a flexible outer cover, which in this embodiment is a gaiter 64. The gaiter 64 is connected to the guide tube 26, and has a recessed portion 66, where a portion of the outer flange ring 58 is disposed in the recessed portion 66 of the gaiter 64. The gaiter 64 flexes and moves as the damper body 12 and adapter ring 42 move during travel of the vehicle.

There is also a seal 68 disposed in the groove 48, such that the seal 68 is in contact with the piston 14 as shown in FIGS. 1 and 2. In this embodiment, the seal 68 is an O-ring, but it is within the scope of the invention that other types of seals may be used. When the piston 14 is positioned as shown in FIGS. 1 and 2, an inner surface 14a of the piston 14 is in contact with both the flange portions 44,46, and the seal 68 is also in contact with and prevents air from flowing between the seal 68 and the inner surface 14a of the piston 14, sealing the cavity 38.

During vehicle travel, there are instances where torsion is induced to the air spring assembly 10. This torsion is typically induced to the air spring assembly 10 as the damper body 12 is subjected to different torsions from other components in the suspension system. The damper body 12, the adapter ring 42, and the inner race 56 of the bearing 62 rotate relative to the piston 14 and the outer race 60 of the bearing 62. Also, as the damper body 12 is rotated when exposed to torsion from the suspension system, the outer flange portion 52 also rotates relative to the outer flange ring 58 of the piston 14. Because the outer flange portion 52 rotates relative to the outer flange ring 58, there is friction between the outer flange portion 52 and the outer flange ring 58.

The piston 14 also rotates relative to and is in frictional contact with the flange portions 44,46, as well as the seal 68, where the seal prevents air from exiting the cavity 38. The bearing 54 facilitates the rotation of the piston 14 relative to the damper body 12 and the adapter ring 42, and because the damper body 12 and the adapter ring 42 are able to rotate relative to the piston 14, this relative movement reduces or eliminates the torsion that is induced to the piston 14 from the damper body 12 by other suspension system components.

While the rotatable machine element 54 has been described as being a bearing, it is within the scope of the invention that other types of rotatable machine elements 54 may be used, such as, but not limited to, a ball bearing, a needle bearing, a journal bearing, a bushing, or the like.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A apparatus comprising:
    an air spring assembly, including:
        a damper body including an outer flange portion;
        a piston, a portion of the damper body disposed in the piston, the piston including an outer flange ring, wherein the outer flange ring seats on and contacts the outer flange portion of the damper body; and
        a decoupling mechanism connected to the damper body, a portion of the piston surrounding the decoupling mechanism, the decoupling mechanism including an adapter ring attached to the damper body, the adapter ring supporting a seal and a rotatable machine element in a radial space between the adaptor ring and the piston;
    wherein the decoupling mechanism allows for rotation of the damper body relative to the piston, preventing torsion from being transferred from the damper body to the piston.

2. The apparatus of claim 1, wherein the adapter ring is surrounded by a portion of the piston.

3. The apparatus of claim 2, the adapter ring further comprising:
    a lower flange portion;
    an upper flange portion;
    a groove disposed between the upper flange portion and the lower flange portion; and
    the seal disposed in the groove;
    wherein the piston surrounds the lower flange portion and the upper flange portion such that the seal is in contact with the inner wall of the piston.

4. The apparatus of claim 2, wherein the inner wall of the piston is in contact with the rotatable machine element, such that the rotatable machine element facilitates relative rotation between the piston and the damper body.

5. The apparatus of claim 2, the rotatable machine element being one selected from the group consisting of a ball bearing, a needle bearing, and a bushing.

6. The apparatus of claim 2, wherein the rotatable machine element is disposed between an inner race and an outer race, with the inner race including a first wall portion in contact with an inner flange of the adaptor ring and a second wall portion in contact with an upper flange portion of the adaptor ring and an inner surface of the piston.

7. The apparatus of claim 1,
wherein outer flange ring rotates relative to the outer flange portion of the damper rotates relative to the piston.

8. The apparatus of claim 1, including a bellow coupled to a top cap and to the piston to a volume that changes as the piston and damper body move, wherein the seal prevents air from the volume from flowing between an inner surface of the piston and the adapter ring and the rotatable machine element is disposed within the volume sealed by the seal.

9. The apparatus of claim 1, including a bellows attached to a top cap at one end and to the piston at another end, wherein the top cap, bellows and piston define a volume that changes responsive to movement of the damper body and a guide tube surrounds the bellows and is attached to the top cap.

10. A decoupling mechanism for an air spring assembly, comprising:
an adaptor ring including at least one flange portion being part of the decoupling mechanism;
a piston having an inner wall and an outer flange ring, the piston being part of the air spring assembly, the decoupling mechanism being disposed in the piston such that the piston circumscribes the adaptor ring and the at least one flange portion, and the at least one flange portion is in contact with the inner wall;
a seal supported on the adaptor ring adjacent the at least one flange portion, the seal being part of the decoupling mechanism, the seal being in contact with the inner wall and the adaptor ring to prevent air from leaking out of the piston; and
a damper body including an outer flange portion connected to and surrounding the damper body, the damper body being part of the air spring assembly, wherein the outer flange ring of the piston seats on contacts outer flange portion; and
a rotatable machine element supported between the adaptor ring and the inner wall of the piston that supports relative rotation between the damper body and the piston;
wherein the piston rotates relative to the adaptor ring and the seal as the piston rotates relative to the damper body.

11. The decoupling mechanism of claim 10, the at least one flange portion further comprising:
an upper flange portion; and
a lower flange portion;
wherein the seal is disposed between the upper flange portion and the lower flange portion.

12. The decoupling mechanism of claim 11, further comprising a groove disposed between the upper flange portion and the lower flange portion, wherein the seal is disposed in the groove.

13. The decoupling mechanism of claim 10, wherein the rotatable machine element surrounds the damper body and is adjacent the at least one flange portion.

14. The decoupling mechanism of claim 13, wherein the inner wall of the piston is in contact with the rotatable machine element, such that the rotatable machine element facilitates relative rotation between the piston and the damper body.

15. The decoupling mechanism of claim 13, the rotatable machine element being one selected from the group consisting of a ball bearing, a needle bearing, and a bushing.

16. The decoupling mechanism of claim 10, wherein the rotatable machine element is disposed between an inner race and an outer race, with the inner race including a first wall portion in contact with an inner flange and a second wall portion in contact with an upper flange portion and an inner surface of the piston.

* * * * *